United States Patent
Takayanagi et al.

(10) Patent No.: US 12,538,932 B2
(45) Date of Patent: Feb. 3, 2026

(54) MODIFIED PEA PROTEIN PRODUCTION METHOD

(71) Applicant: AJINOMOTO CO., INC., Tokyo (JP)

(72) Inventors: Hiroshi Takayanagi, Kawasaki (JP); Hiroyuki Nakagoshi, Kawasaki (JP); Rikiya Ishida, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 348 days.

(21) Appl. No.: 17/646,186

(22) Filed: Dec. 28, 2021

(65) Prior Publication Data

US 2022/0117260 A1 Apr. 21, 2022

Related U.S. Application Data

(63) Continuation of application No. PCT/JP2020/026035, filed on Jul. 2, 2020.

(30) Foreign Application Priority Data

Jul. 3, 2019 (JP) .................. 2019-124835

(51) Int. Cl.
*A23J 1/14* (2006.01)
*C07K 14/415* (2006.01)

(52) U.S. Cl.
CPC ............ *A23J 1/148* (2013.01); *C07K 14/415* (2013.01)

(58) Field of Classification Search
CPC ...... A23J 3/14; A23J 3/227; A23J 1/14; A23J 3/346; A23J 3/34; A23J 3/00; A23J 1/006; A23J 1/148; A23L 33/185; C07K 14/415
USPC .............................. 426/49, 52, 63
See application file for complete search history.

(56) References Cited

U.S. PATENT DOCUMENTS

| | | |
|---|---|---|
| 2004/0185147 A1 | 9/2004 | Hwang |
| 2016/0286831 A1 | 10/2016 | Bourgeois et al. |
| 2017/0150734 A1* | 6/2017 | Lorand ............... A23J 3/16 |
| 2019/0191735 A1 | 6/2019 | Bansal-Mutalik et al. |

FOREIGN PATENT DOCUMENTS

| | | | |
|---|---|---|---|
| CN | 101422206 A | 5/2009 | |
| CN | 101703147 A | 5/2010 | |
| CN | 103145860 A | 6/2013 | |
| JP | 2004-283173 A | 10/2004 | |
| JP | 2019-509036 A | 4/2019 | |
| WO | WO-2011050471 A1 * | 5/2011 | ........... A23L 1/3053 |

OTHER PUBLICATIONS

Ma X et al., CN-101703147 A, Machine Translation English Abstract, Claims, 05/12/20210, pp. 1-2. (Year: 2010).*
Combined Chinese Office Action and Search Report issued Jan. 6, 2024, in corresponding Chinese Patent Application No. 202080047093.7 (with English Translation and English Translation of Category of Cited Documents) citing documents 24 and 25 therein, 17 pages.
Extended European Search Report issued on Jun. 21, 2023 in the corresponding European Patent Application No. 20834277.4, citing reference 1 therein, 8 pages.
International Search Report issued Sep. 15, 2020 in PCT/JP2020/026035 (with English translation), citing documents AO through AQ and AX therein, 5 pages.
Barac, M.B., et al., "Techno-Functional Properties of PEA (Pisum sativum) Protein Isolates—A Review", APTEFF, vol. 46, 2015, pp. 1-18.
Combined Chinese Office Action and Search Report issued Jan. 6, 2024, in corresponding Chinese Patent Application No. 202080047093.7 (with English Translation and English Translation of Category of Cited Documents), 17 pages.
Food enzyme preparations and applications, Ed. Spring, Beijing: Chinese metering press, 1st edition, 1st print, pp. 142-143, Jun. 2008, 6 pages.
"Chinese Protein Feed Resources", Ed. Leijing, Beijing: Chinese Agricultural University Press, 1st edition, 1st print, pp. 94-96, Jan. 2013, 4 pages.

* cited by examiner

*Primary Examiner* — Hong T Yoo
(74) *Attorney, Agent, or Firm* — Oblon, McClelland, Maier & Neustadt, L.L.P.

(57) ABSTRACT

Methods including (1) a step of obtaining a water dispersion of a pea ground product by dry pulverizing the pea and mixing same with water, or wet pulverizing the pea in water, (2) a step of obtaining an enzymatic reaction mixture by adding transglutaminase to a solution obtained by removing solid substances from the water dispersion obtained in step (1) or the water dispersion obtained in step (1), and (3) a step of adding an acid to the enzymatic reaction mixture obtained in step (2) and collecting the precipitate, are useful for preparing a modified pea protein having increased viscosity.

3 Claims, No Drawings

MODIFIED PEA PROTEIN PRODUCTION METHOD

CROSS REFERENCES TO RELATED APPLICATIONS

This application is a continuation of International Patent Application No. PCT/JP2020/026035, filed on Jul. 2, 2020, and claims priority to Japanese Patent Application No. 2019-124835, filed on Jul. 3, 2019, both of which are incorporated herein by reference in their entireties.

BACKGROUND OF THE INVENTION

Field of the Invention

The present invention relates to methods for producing a modified pea protein (particularly, a pea protein with increased viscosity); modified pea proteins (particularly, pea protein with increased viscosity) obtained by said production method; and methods for increasing the viscosity of a pea protein.

Discussion of the Background

The market for pea protein has been expanding in recent years. However, pea protein has a much lower viscosity when dissolved than soybean protein, which is the main plant protein, and thus shows a low thickening ability, which makes it difficult to expand the range of application. Therefore, the development of a pea protein with increased viscosity is demanded.

CN-A-101703147, which is incorporated herein by reference in its entirety, discloses that the gelling ability was improved by adding transglutaminase to a pea protein solution and performing an enzymatic reaction. However, CN-A-101703147 does not describe addition of transglutaminase in a specific step as in the present invention.

JP-A-2004-283173, which is incorporated herein by reference in its entirety, discloses a method for producing linked soybean protein by adding transglutaminase to the supernatant of soybean slurry and performing an enzymatic reaction. However, JP-A-2004-283173 describes only soybean protein as a plant-derived protein and does not describe pea protein.

SUMMARY OF THE INVENTION

Accordingly, it is one object of the present invention to provide a method for producing a modified pea protein (particularly, pea protein with increased viscosity).

It is another object of the present invention to provide a modified pea protein (particularly, pea protein with increased viscosity) obtained by said production method.

It is another object of the present invention to provide a method for increasing the viscosity of a pea protein.

These and other objects, which will become apparent during the following detailed description, have been achieved by the inventors' discovery that a pea protein with increased viscosity can be produced by adding transglutaminase in a specific step of production.

Accordingly, the present invention provides the following.

(1) A method for producing a modified pea protein, comprising (1) a step of obtaining a water dispersion of a pea ground product by dry pulverizing the pea and mixing same with water, or wet pulverizing the pea in water, (2) a step of obtaining an enzymatic reaction mixture by adding transglutaminase to a solution obtained by removing solid substances from the water dispersion obtained in step (1) or the water dispersion obtained in step (1), and (3) a step of adding an acid to the enzymatic reaction mixture obtained in step (2) and collecting the precipitate.

(2) The production method of the above-mentioned (1), wherein the transglutaminase is added in an amount of 0.01 to 100 units per 1 g of the protein.

(3) A modified pea protein obtained by the production method of the above-mentioned (1) or (2).

(4) A method for increasing a viscosity of a pea protein, comprising (1) a step of obtaining a water dispersion of a pea ground product by dry pulverizing the pea and mixing same with water, or wet pulverizing the pea in water, (2) a step of obtaining an enzymatic reaction mixture by adding transglutaminase to a solution obtained by removing solid substances from the water dispersion obtained in step (1) or the water dispersion obtained in step (1), and (3) a step of adding an acid to the enzymatic reaction mixture obtained in step (2) and collecting the precipitate.

(5) The method of the above-mentioned (4), wherein the transglutaminase is added in an amount of 0.01 to 100 units per 1 g of the protein.

Advantageous Effects of Invention

According to the present invention, a method for producing a modified pea protein (particularly, pea protein with increased viscosity); a modified pea protein (particularly, pea protein with increased viscosity) obtained by said production method; and a method for increasing the viscosity of a pea protein can be provided.

The modified pea protein (particularly, pea protein with increased viscosity) obtained by the production method of the present invention is advantageous in that the range of application can be expanded as compared with conventional separated pea proteins.

Separated pea protein powder extracted from pea is commercially available (e.g., Pisane C9 (trade name), manufactured by Cosucra). When an enzyme is added to increase the viscosity of protein in a step of adding such conventional separated pea protein powder to foods and beverages to produce final products, complicated operations such as enzyme addition/reaction step, addition of control items and the like become necessary.

When final products are produced by adding the pea protein with increased viscosity obtained by the production method of the present invention to foods and beverages, it is advantageous in that the addition of an enzyme is not required during the production of the final products, which simplifies the production of the final products.

In addition, pea protein is likely to undergo a sterilization step when actually added to foods and beverages. Since the modified pea protein obtained by the production method of the present invention can maintain or improve its viscosity even when heated, the sterilization step in actual use can be performed without problems, as is clear from the results of the below-mentioned Experimental Examples 1 to 3. In addition, the modified pea protein obtained by the production method of the present invention has the effect of increasing viscosity even when not heated, as is clear from the results of the below-mentioned Experimental Examples 1 and 2.

Furthermore, since the modified pea protein obtained by the production method of the present invention can be gelled at a low protein concentration, it is useful in the production of foods from the aspects of reducing starting materials, and the like.

DETAILED DESCRIPTION OF THE PREFERRED EMBODIMENTS

The present invention is explained in detail in the following.

Transglutaminase is an enzyme having an activity of catalyzing an acylmetastasis reaction using a glutamine residue in a protein or peptide as a donor and a lysine residue as a receptor. Transglutaminases of various origins are known, such as those derived from mammals, those derived from fish, those derived from microorganisms, and the like. The origin of the transglutaminase to be used in the present invention is not particularly limited as long as it has the above-mentioned activity, and any transglutaminase of any origin can be used. Alternatively, a recombinant enzyme may also be used. The transglutaminase to be used in the present invention may be a commercially available product. As a specific example, a microorganism-derived transglutaminase commercially available under the trade name "Activa" TG from Ajinomoto Co., Inc. or the like can be used.

In the present invention, the active unit of transglutaminase is measured and defined as follows. That is, transglutaminase is allowed to act in a reaction system using benzyloxycarbonyl-L-glutamyl glycine and hydroxylamine as substrates in a Tris buffer solution at a temperature of 37° C., pH 6.0. After forming an iron complex of the produced hydroxamic acid in the presence of trichloroacetic acid, the absorbance at 525 nm is measured. The amount of hydroxamic acid is determined by a calibration curve, and the amount of enzyme that produces 1 μmol of hydroxamic acid per minute is taken as 1 unit (1 U) (see JP-A-S64-27471, which is incorporated herein by reference in its entirety).

The production method of the modified pea protein of the present invention includes the following steps (1) to (3).

step (1): a step of obtaining a water dispersion of a pea ground product by dry pulverizing the pea and mixing same with water, or wet pulverizing the pea in water step (2): a step of obtaining an enzymatic reaction mixture by adding transglutaminase to a solution obtained by removing solid substances from the water dispersion obtained in step (1) or the water dispersion obtained in step (1)

step (3): a step of adding an acid to the enzymatic reaction mixture obtained in step (2) and collecting the precipitate.

Step (1)

In step (1), a water dispersion of a pea ground product is obtained by dry pulverizing the pea and mixing same with water, or wet pulverizing the pea in water.

Examples of the pea used in the present invention include yellow pea, red pea, and the like, and any kind of ripe seeds of the *Pisum sativum* can be used.

Dry pulverization can be performed by a known method, and examples thereof include impact grinding machine, pin mill, jet mill, ball mill and the like.

Water is added to the pea ground product (pea powder) obtained by dry pulverization, and the mixture is stirred to obtain a water dispersion of the pea ground product. The amount of water to be added is, for example, 60 to 1000 parts by weight per 15 parts by weight of the pea ground product. Stirring can be performed by a known method, for example, at 20° C. for 1 hr.

In addition, a water dispersion of the pea ground product can be obtained by wet pulverization.

Wet pulverization can be performed by a known method, and examples thereof include a ball mill and the like. The amount of water to be used can be appropriately selected. If necessary, water is further added to the water dispersion obtained by wet pulverization and, for example, a water dispersion of the pea ground product containing 60 to 1000 parts by weight of water per 15 parts by weight of the pea ground product can be obtained.

In the present invention, as the pea ground product, for example, one having D95, representing a cumulative volume of 95% from the small particle size side in the particle size distribution curve, of 200 μm or below can be used. The particle size can be measured by, for example, a laser diffraction/scattering type particle size distribution measuring device.

Step (2)

In step (2), an enzymatic reaction mixture is obtained by adding transglutaminase to a solution obtained by removing solid substances from the water dispersion obtained in step (1) or the water dispersion obtained in step (1).

As a method for removing solid substances from the water dispersion obtained in step (1), for example, centrifugation and filtration can be mentioned. Centrifugation can be performed by a known method, for example, at 20° C. (6000 g×30 min). Filtration can be performed by a known method, for example, paper filter (e.g., Whatman, 520B 1/2 FF) and the like. Centrifugation and filtration may be performed in combination. Transglutaminase is added to a solution after removal of solid substances (supernatant recovered by centrifugation, or filtrate recovered by filtration).

The amount of transglutaminase to be added is preferably 0.01 to 100 units, more preferably 0.1 to 10 units, particularly preferably 0.5 to 5 units, per 1 g of protein in the target substance (solution after removal of solid substances from the water dispersion obtained in step (1), or the water dispersion obtained in step (1)). In the present specification, the "protein" of "per 1 g of the protein" is a value obtained by multiplying the amount of nitrogen contained in the target substance by the nitrogen conversion coefficient 5.7.

The reaction time after addition of transglutaminase, that is, the time from enzyme addition to acid addition is 10 min to 24 hr (preferably 1 hr), and the enzymatic reaction temperature is 0 to 60° C. (preferably 50° C.). When the reaction time is less than 10 min, the effect of adding the enzyme is not sufficiently obtained, and when it exceeds 24 hr, the productivity becomes low by occupying the tank in the factory, and the like. When the reaction temperature is less than 0° C., the solution freezes and the enzymatic reaction does not proceed, and when it exceeds 60° C., the enzyme is inactivated. It is more preferable to stir during the enzymatic reaction, and the stirring can be performed by a known method.

The water dispersion obtained in step (1) (pea slurry), or the solution obtained by removing solid substances from the water dispersion (pea slurry supernatant or filtrate) contains proteins and water-soluble saccharides that are dissolved in neutral water. The method of the present invention is characterized in that transglutaminase is added to such dispersion or solution and the enzymatic reaction is carried out.

On the other hand, conventional, commercially available separated pea protein powder is generally extracted from pea powder, separated by acid addition, and dried, and the main component is protein that was not dissolved in acid in the separation step. Therefore, the components of the dispersion or solution to which transglutaminase is added to carry out the enzymatic reaction in the present invention are different from the components of the conventional, commercially available separated pea protein powder. That is, a part of the protein contained in the dispersion or solution to which transglutaminase is added to carry out the enzymatic reaction in the present invention has been removed by a separation step by adding an acid in the conventional, commercially available separated pea protein powder.

Step (3)

In step (3), the modified pea protein of the present invention is obtained by adding an acid to the enzymatic reaction mixture obtained in step (2) and collecting the precipitate (separated pea protein curd).

Examples of the acid include hydrochloric acid, sulfuric acid, phosphoric acid and the like. A precipitate is formed by adding an acid to adjust the pH to 3.0 to 6.1 (preferably pH 4.5), followed by stirring.

Examples of the method for collecting the precipitate include centrifugation, filtration, and decantation.

Centrifugation can be performed by a known method, for example, at 20° C. (6000 g×30 min). Filtration can be performed by a known method, for example, paper filtration, or the like. Centrifugation and filtration may be performed in combination.

In the production method of the present invention, the modified pea protein (dried product) of the present invention can also be obtained by drying the precipitate (separated pea protein curd) obtained in step (3). Drying can be performed by, for example, the following step.

Water is added to re-dissolve the precipitate obtained in step (3) (where necessary, alkali is added for neutralization (adjusted to pH 7)) to obtain a separated pea protein solution. Examples of the alkali include sodium hydroxide, potassium hydroxide and the like.

Then, the obtained separated pea protein solution is dried to give a dried separated pea protein (modified pea protein of the present invention).

Examples of the drying method include freeze-drying, spray drying, drum drying and the like. Drying such as freeze-drying, spray drying, drum drying and the like can be performed by a known method.

Heating before the above-mentioned drying step can deactivate the enzyme (transglutaminase). The heating temperature may be any temperature exceeding 60° C.

When an enzyme is added to increase the viscosity of protein in a step of adding conventional separated pea protein powder to foods and beverages to produce final products, the final products manufactured without undergoing a deactivation step such as heating and the like after enzyme addition are obliged to indicate the enzyme in the raw material labeling, which in turn develops disadvantages such as change of packaging materials, reduction of acceptability for distribution and consumers, and the like.

In the production method of the present invention, the pea protein with increased viscosity which is obtained via the above-mentioned drying step is advantageous in that there is no need for a further deactivation step such as heating and the like when manufacturing the final product or description of the enzyme in the final product label, as long as sufficient heating capable of deactivating the enzyme can be performed between the enzyme addition step and the drying step.

The modified pea protein of the present invention can be obtained by the above-mentioned production method of the present invention. The term "modified" means that the properties of the pea protein such as viscosity and the like have changed by the enzymatic reaction.

The modified pea protein of the present invention shows increased viscosity (e.g., viscosity of pea protein solution or dispersion when dissolved or dispersed in a solvent such as water and the like).

The modified pea protein of the present invention can be safely ingested by humans and non-human animals (e.g., mammals and birds such as livestock, poultry, laboratory animals and the like) directly or by adding to food (feed).

The intake amount of the modified pea protein of the present invention is not particularly limited, and may be appropriately selected according to the protein intake of general food (feed).

In the present specification, food is a concept that broadly includes foods that can be ingested orally (excluding pharmaceutical products), and includes not only so-called "food" but also beverages, health supplement, food with health claims (e.g., food for specified health uses, food with functional claims, food with nutrient function claims), supplement, and the like.

The present invention also relates to a method for increasing the viscosity of a pea protein, and includes the following steps:

step (1): a step of obtaining a water dispersion of a pea ground product by dry pulverizing the pea and mixing same with water, or wet pulverizing the pea in water step (2): a step of obtaining an enzymatic reaction mixture by adding transglutaminase to a solution obtained by removing solid substances from the water dispersion obtained in step (1) or the water dispersion obtained in step (1)

step (3): a step of adding an acid to the enzymatic reaction mixture obtained in step (2) and collecting the precipitate.

The steps (1) to (3) of the method for increasing the viscosity of the pea protein of the present invention can be performed similarly to the steps (1) to (3) of the aforementioned production method of the modified pea protein of the present invention. In addition, the method for increasing the viscosity of the pea protein of the present invention may include the drying step explained for the production method.

The method of the present invention increases the viscosity of pea protein (e.g., viscosity of pea protein solution or dispersion obtained by dissolving or dispersing in a solvent such as water and the like).

In the present invention, the viscosity can be measured by, for example, AR2 Rheometer (TA Instruments).

Other features of the invention will become apparent in the course of the following descriptions of exemplary embodiments which are given for illustration of the invention and are not intended to be limiting thereof.

EXAMPLES

In the following Examples and Comparative Examples 2, 6, Activa TG (trade name) (Ajinomoto Co., Inc.) was used as transglutaminase.

Example 1

Water (85 parts by weight) was added to 15 parts by weight of yellow pea powder obtained by dry pulverization of yellow peas (powder with D95 of 149 μm or less as the standard particle size measured by a laser diffraction/scattering type particle size distribution measuring device), and the mixture was stirred at 20° C. for 1 hr, and centrifuged at 20° C. (6000 g×30 min). The supernatant was collected and filtered through a paper filter (Whatman, 520B 1/2 FF) to obtain a pea solution. To the obtained pea solution was added 1.0 unit of transglutaminase per 1 g of protein, and the mixture was stirred at 50° C. for 1 hr. Hydrochloric acid was added to this solution to adjust the pH to 4.5, and the mixture was stirred at 20° C. for 30 min and centrifuged at 20° C. (6000 g×30 min). The precipitate was collected to obtain a separated pea protein curd. Water (3 parts by weight) was added to 1 part by weight of the obtained curd to disperse the curd. Sodium hydroxide was added to adjust the solution pH to 7.0, and the curd was dissolved to obtain a separated pea protein solution. The obtained solution was frozen and lyophilized to obtain a dried separated pea protein of Example 1.

Comparative Example 1

By the same method as in Example 1 except that "To the obtained pea solution was added 1.0 unit of transglutaminase per 1 g of protein, and the mixture was stirred at 50° C. for 1 hr" in Example 1 was changed to "The obtained pea solution was stirred at 50° C. for 1 hr (without addition of transglutaminase)", a dried separated pea protein of Comparative Example 1 was obtained.

Comparative Example 2

Water (85 parts by weight) was added to 15 parts by weight of yellow pea powder obtained by dry pulverization of yellow peas (powder with D95 of 149 μm or less as the standard particle size measured by a laser diffraction/scattering type particle size distribution measuring device), and the mixture was stirred at 20° C. for 1 hr, and centrifuged at 20° C. (6000 g×30 min). The supernatant was collected and filtered through a paper filter (Whatman, 520B 1/2 FF) to obtain a pea solution. To the obtained pea solution was added hydrochloric acid to adjust the pH to 4.5, and the mixture was stirred at 20° C. for 30 min and centrifuged at 20° C. (6000 g×30 min). The precipitate was collected to obtain a separated pea protein curd. Water (3 parts by weight) was added to 1 part by weight of the obtained curd to disperse the curd. Sodium hydroxide was added to adjust the solution pH to 7.0, and the curd was dissolved to obtain a separated pea protein solution. To the obtained separated pea protein solution was added 1.0 unit of transglutaminase per 1 g of protein, and the mixture was stirred at 50° C. for 1 hr. The solution was frozen and lyophilized to obtain a dried separated pea protein of Comparative Example 2.

Comparative Example 3

By the same method as in Comparative Example 2 except that "To the obtained separated pea protein solution was added 1.0 unit of transglutaminase per 1 g of protein, and the mixture was stirred at 50° C. for 1 hr" in Comparative Example 2 was changed to "The obtained separated pea protein solution was stirred at 50° C. for 1 hr (without addition of transglutaminase)", a dried separated pea protein of Comparative Example 3 was obtained.

Experimental Example 1

Water (95 parts by weight) was added to 5 parts by weight of each of the dried separated pea proteins obtained in Example 1 and Comparative Examples 1 to 3 to obtain respective separated pea protein dispersions.

After heating the respective separated pea protein dispersions at 90° C. for 15 min, the viscosity (Pa·s) at shear rates 10(/s) and 100(/s) was measured at sample temperature 20° C. by AR2 Rheometer (TA Instruments). The results are shown in Table 1.

Separately, the viscosity (Pa·s) at shear rates 10(/s) and 100(/s) of the respective separated pea protein dispersions was measured at sample temperature 20° C. by AR2 Rheometer (TA Instruments), without performing "heating at 90° C. for 15 min". The results are shown in Table 2.

TABLE 1 viscosity of separated pea protein dispersion by different timing of transglutaminase addition (with heating at 90° C. for 15 min in measurement)

|  | Ex. 1 | Comp. Ex. 1 | Comp. Ex. 2 | Comp. Ex. 3 |
|---|---|---|---|---|
| amount of transglutaminase added (U/g protein) | 1.0 | 0 | 1.0 | 0 |
| heating of sample | | 90° C. 15 min | | |
| viscosity (Pa · s) (shear rate 10/s) | 0.5 | 0.008 | 0.008 | 0.007 |
| viscosity (Pa · s) (shear rate 100/s) | 0.06 | 0.008 | 0.007 | 0.007 |

TABLE 2 viscosity of separated pea protein dispersion by different timing of transglutaminase addition (without heating in measurement)

|  | Ex. 1 | Comp. Ex. 1 | Comp. Ex. 2 | Comp. Ex. 3 |
|---|---|---|---|---|
| amount of transglutaminase added (U/g protein) | 1.0 | 0 | 1.0 | 0 |
| heating of sample | | none | | |
| viscosity (Pa · s) (shear rate 10/s) | 0.05 | 0.007 | 0.007 | 0.006 |
| viscosity (Pa · s) (shear rate 100/s) | 0.02 | 0.006 | 0.007 | 0.006 |

Example 2

Water (85 parts by weight) was added to 15 parts by weight of yellow pea powder obtained by dry pulverization of yellow peas (powder with D95 of 149 μm or less as the standard particle size measured by a laser diffraction/scattering type particle size distribution measuring device), and the mixture was stirred at 20° C. for 1 hr, and centrifuged at 20° C. (6000 g×30 min). The supernatant was collected and filtered through a paper filter (Whatman, 520B 1/2 FF) to obtain a pea solution. To the obtained pea solution was added 1.0 unit of transglutaminase per 1 g of protein, and the mixture was stirred at 50° C. for 1 hr. Hydrochloric acid was added to this solution to adjust the pH to 4.5, and the mixture was stirred at 20° C. for 30 min and centrifuged at 20° C. (6000 g×30 min). The precipitate was collected to obtain a separated pea protein curd. Water (3 parts by weight) was added to 1 part by weight of the obtained curd to disperse the curd. Sodium hydroxide was added to adjust the solution pH to 7.0, and the curd was dissolved to obtain a separated pea protein solution. The obtained solution was spray dried to obtain a dried separated pea protein of Example 2.

Example 3

By the same method as in Example 2 except that the amount of transglutaminase to be added was changed from "1.0 unit per 1 g of the protein" to "0.5 units per 1 g of the protein", a dried separated pea protein of Example 3 was obtained.

Comparative Example 4

By the same method as in Example 2 except that "To the obtained pea solution was added 1.0 unit of transglutaminase per 1 g of protein, and the mixture was stirred at 50° C. for 1 hr" in Example 2 was changed to "The obtained pea solution was stirred at 50° C. for 1 hr (without addition of transglutaminase)", a dried separated pea protein of Comparative Example 4 was obtained.

Experimental Example 2

Water (95 parts by weight) was added to 5 parts by weight of each of the dried separated pea proteins obtained in Examples 2 and 3, and Comparative Example 4 to obtain respective separated pea protein dispersions.

After heating the respective separated pea protein dispersions at 90° C. for 15 min, the viscosity (Pa·s) at shear rates 10(/s) and 100(/s) was measured at sample temperature 20° C. by AR2 Rheometer (TA Instruments). The results are shown in Table 3.

Separately, the viscosity (Pa·s) at shear rates 10(/s) and 100(/s) of the respective separated pea protein dispersions was measured at sample temperature 20° C. by AR2 Rheometer (TA Instruments), without performing "heating at 90° C. for 15 min". The results are shown in Table 4.

TABLE 3 viscosity of spray dry pea protein dispersion (with heating at 90° C. for 15 min in measurement)

|  | Ex. 2 | Ex. 3 | Comp. Ex. 4 |
| --- | --- | --- | --- |
| amount of transglutaminase added (U/g protein) | 1.0 | 0.5 | 0 |
| heating of sample | | 90° C. 15 min | |
| viscosity (Pa · s) (shear rate 10/s) | 0.2 | 0.011 | 0.0095 |
| viscosity (Pa · s) (shear rate 100/s) | 0.09 | 0.010 | 0.0090 |

TABLE 4 viscosity of spray dry pea protein dispersion (without heating in measurement)

|  | Ex. 2 | Ex. 3 | Comp. Ex. 4 |
| --- | --- | --- | --- |
| amount of transglutaminase added (U/g protein) | 1.0 | 0.5 | 0 |
| heating of sample | | none | |
| viscosity (Pa · s) (shear rate 10/s) | 0.007 | 0.017 | 0.0077 |
| viscosity (Pa · s) (shear rate 100/s) | 0.01 | 0.011 | 0.007 |

Example 4

Water (85 parts by weight) was added to 15 parts by weight of yellow pea powder obtained by dry pulverization of yellow peas (powder with D95 of 50 µm or less as the particle size measured by a laser diffraction/scattering type particle size distribution measuring device), and the mixture was stirred at 20° C. for 1 hr, and centrifuged at 20° C. (6000 g×30 min). The supernatant was collected and filtered through a paper filter (Whatman, 520B 1/2 FF) to obtain a pea solution. To the obtained pea solution was added 1.0 unit of transglutaminase per 1 g of protein, and the mixture was stirred at 50° C. for 1 hr. Hydrochloric acid was added to this solution to adjust the pH to 4.5, and the mixture was stirred at 20° C. for 30 min and centrifuged at 20° C. (6000 g×30 min). The precipitate was collected to obtain a separated pea protein curd. Water (3 parts by weight) was added to 1 part by weight of the obtained curd to disperse the curd. Sodium hydroxide was added to adjust the solution pH to 7.0, and the curd was dissolved to obtain a separated pea protein solution. The obtained solution was frozen and lyophilized to obtain a dried separated pea protein of Example 4.

Comparative Example 5

By the same method as in Example 4 except that "To the obtained pea solution was added 1.0 unit of transglutaminase per 1 g of protein, and the mixture was stirred at 50° C. for 1 hr" in Example 4 was changed to "The obtained pea solution was stirred at 50° C. for 1 hr (without addition of transglutaminase)", a dried separated pea protein of Comparative Example 5 was obtained.

Comparative Example 6

Water (85 parts by weight) was added to 15 parts by weight of yellow pea powder obtained by dry pulverization of yellow peas (powder with D95 of 50 µm or less as the particle size measured by a laser diffraction/scattering type particle size distribution measuring device), and the mixture was stirred at 20° C. for 1 hr, and centrifuged at 20° C. (6000 g×30 min). The supernatant was collected and filtered through a paper filter (Whatman, 520B 1/2 FF) to obtain a pea solution. To the obtained pea solution was added hydrochloric acid to adjust the pH to 4.5, and the mixture was stirred at 20° C. for 30 min and centrifuged at 20° C. (6000 g×30 min). The precipitate was collected to obtain a separated pea protein curd. Water (3 parts by weight) was added to 1 part by weight of the obtained curd to disperse the curd. Sodium hydroxide was added to adjust the solution pH to 7.0, and the curd was dissolved to obtain a separated pea protein solution. To the obtained separated pea protein solution was added 1.0 unit of transglutaminase per 1 g of protein, and the mixture was stirred at 50° C. for 1 hr. The solution was frozen and lyophilized to obtain a dried separated pea protein of Comparative Example 6.

Comparative Example 7

By the same method as in Comparative Example 6 except that "To the obtained separated pea protein solution was added 1.0 unit of transglutaminase per 1 g of protein, and the mixture was stirred at 50° C. for 1 hr" in Comparative Example 6 was changed to "The obtained separated pea protein solution was stirred at 50° C. for 1 hr (without addition of transglutaminase)", a dried separated pea protein of Comparative Example 7 was obtained.

Experimental Example 3

Water (95 parts by weight) was added to 5 parts by weight of each of the dried separated pea proteins obtained in Example 4 and Comparative Examples 5 to 7 to obtain respective separated pea protein dispersions (solution concentration 5%). Separately, water (90 parts by weight) was added to 10 parts by weight of each of the dried separated pea proteins obtained in Example 4 and Comparative Examples 5 to 7 to obtain respective separated pea protein dispersions (solution concentration 10%).

After heating the respective separated pea protein dispersions at 90° C. for 15 min, the viscosity (Pa·s) at shear rates 10(/s) and 100(/s) was measured at sample temperature 20° C. by ARES G2 Rheometer (TA Instruments). The results are shown in Table 5.

In Example 4, gelling occurred as a result of an increase in viscosity at solution concentration 10%. Gelling at a low protein concentration is useful in the production of foods from the viewpoint of reducing starting materials and the like.

TABLE 5

| | | Ex. 4 | Comp. Ex. 5 | Comp. Ex. 6 | Comp. Ex. 7 |
|---|---|---|---|---|---|
| amount of transglutaminase added (U/g protein) | | 1.0 | 0 | 1.0 | 0 |
| heating of sample | | | 90° C. 15 min | | |
| solution concentration 5% | viscosity (Pa · s) (shear rate 10/s) | 0.017 | 0.0037 | 0.0051 | 0.0035 |
| | viscosity (Pa · s) (shear rate 100/s) | 0.0089 | 0.0034 | 0.0046 | 0.0030 |
| solution concentration 10% | viscosity (Pa · s) (shear rate 10/s) | gelled | 0.0018 | 0.087 | 0.0019 |
| | viscosity (Pa · s) (shear rate 100/s) | | 0.016 | 0.046 | 0.017 |

INDUSTRIAL APPLICABILITY

According to the present invention, a method for producing a modified pea protein (particularly, pea protein with increased viscosity) and the like can be provided.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method for producing a modified pea protein, comprising:
   (1) dry pulverizing a pea into a pea ground product and mixing the pea ground product with water, or wet pulverizing a pea in water, to obtain a water dispersion of a ground pea product,
   (2) adding transglutaminase to a solution obtained by removing solid substances from the water dispersion obtained in step (1) or the water dispersion obtained in step (1), to obtain an enzymatic reaction mixture,
   (3) adding an acid to the enzymatic reaction mixture obtained in step (2) to obtain a precipitate, and collecting the precipitate, which contains a modified pea protein, and
   (4) adding water to re-dissolve the precipitate obtained in step (3) to obtain a modified pea protein solution, and freeze drying the modified pea protein solution to give a dried modified pea protein,
   wherein the transglutaminase is added in an amount of 1 to 5 units per 1 g of the protein in the solution obtained by removing solid substances from the water dispersion obtained in step (1) or the water dispersion obtained in step (1).

2. A modified pea protein obtained by the method for producing a modified pea protein according to claim 1.

3. A method for increasing a viscosity of a pea protein, comprising:
   (1) dry pulverizing a pea into a pea ground product and mixing the pea ground product with water, or wet pulverizing a pea in water, to obtain a water dispersion of a ground pea product,
   (2) adding transglutaminase to a solution obtained by removing solid substances from the water dispersion obtained in step (1) or the water dispersion obtained in step (1), to obtain an enzymatic reaction mixture,
   (3) adding an acid to the enzymatic reaction mixture obtained in step (2) to obtain a precipitate, and collecting the precipitate, which contains a modified pea protein with an increased viscosity, and
   (4) adding water to re-dissolve the precipitate obtained in step (3) to obtain a modified pea protein solution, and freeze drying the modified pea protein solution to give a dried modified pea protein,
   wherein the transglutaminase is added in an amount of 1 to 5 units per 1 g of the protein in the solution obtained by removing solid substances from the water dispersion obtained in step (1) or the water dispersion obtained in step (1).

* * * * *